United States Patent
Tseng et al.

(10) Patent No.: US 11,144,984 B2
(45) Date of Patent: Oct. 12, 2021

(54) ADAPTIVE ORDERING FROM A VEHICLE

(71) Applicant: Ford Global Technologies, LLC, Dearborn, MI (US)

(72) Inventors: Fling Tseng, Ann Arbor, MI (US); Johannes Kristinsson, Ann Arbor, MI (US); Aed Dudar, Canton, MI (US); Shiqi Qiu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 117 days.

(21) Appl. No.: 16/184,313

(22) Filed: Nov. 8, 2018

(65) Prior Publication Data
US 2020/0151800 A1  May 14, 2020

(51) Int. Cl.
*G06Q 30/00* (2012.01)
*G06Q 30/06* (2012.01)
*G01C 21/36* (2006.01)

(52) U.S. Cl.
CPC ..... *G06Q 30/0633* (2013.01); *G01C 21/3697* (2013.01)

(58) Field of Classification Search
CPC .............. G06Q 30/0633; G01C 21/3697
See application file for complete search history.

(56) References Cited

U.S. PATENT DOCUMENTS

| 2017/0124670 A1* | 5/2017 | Becker ................. H04W 4/027 |
| 2017/0278202 A1 | 9/2017 | Mimassi |
| 2018/0089621 A1 | 3/2018 | Barrara et al. |
| 2019/0012625 A1* | 1/2019 | Lawrenson ............ G06Q 50/12 |

OTHER PUBLICATIONS

Liyanage, Vindya, et al. "Foody-Smart Restaurant Management and Ordering System." 2018 IEEE Region 10 Humanitarian Technology Conference (R10-HTC). IEEE, 2018.*

* cited by examiner

*Primary Examiner* — Kathleen Palavecino
(74) *Attorney, Agent, or Firm* — Michael Spenner; Brooks Kushman P.C.

(57) ABSTRACT

A vehicle includes a controller, programmed to responsive to user input to pick up an item at a shop, calculate an estimated time of arrival (ETA) to the shop and a predicted preparation time for the item by the shop; and responsive to a current time being within a grace period to the preparation time before the ETA, place an order for the item.

12 Claims, 3 Drawing Sheets

ADAPTIVE ORDERING FROM A VEHICLE

TECHNICAL FIELD

The present disclosure is generally related to an online ordering system through a vehicle. More specifically, the present disclosure is related to a vehicle system configured to place an online order at a predetermined time frame.

BACKGROUND

Online ordering systems for food and other goods have been widely used by various consumers. For instance, a customer may place an online order for an item, such as a sandwich, ice tea or the like before leaving home in the morning and pick up the item on the route to work. However, there is usually a gap between the time to travel to the target restaurant and the time for the restaurant to prepare the food. If the restaurant starts to prepare the food too early right after receiving the online order, by the time the customer arrives, the food may have been sitting there for a long time and no longer fresh.

SUMMARY

In one or more illustrative embodiment of the present disclosure, a vehicle includes a controller, programmed to responsive to user input to pick up an item at a shop, calculate an estimated time of arrival (ETA) to the shop and a predicted preparation time for the item by the shop; and responsive to a current time being within a grace period to the preparation time before the ETA, place an order for the item.

In one or more illustrative embodiment of the present disclosure, a method for a vehicle includes responsive to user input to pick up an item at a shop, calculating an estimated time of arrival (ETA) to the shop and a predicted preparation time for the item by the shop including a waiting time and a processing time for the item; and responsive to a current time being within a predefined grace period to the preparation time before the ETA, ordering the item online.

In one or more illustrative embodiment of the present disclosure, a non-transitory computer-readable medium includes instructions that, when executed by a processor of a vehicle, cause the vehicle to responsive to user input to pick up an item at a shop, calculate an estimated time of arrival (ETA) to the shop and a predicted preparation time for the item by the shop including a waiting time and a processing time for the item; and responsive to a current time being within a predefined grace period to the preparation time before the ETA, place an order for the item online, wherein the waiting time is based on a shop popularity information received from a server.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes an online ordering system for a vehicle. More specifically, the present disclosure proposes a vehicle system configured to allow a user to place and hold an order for goods and send the order out at a predefined time calculated by various factors.

Figure 1:
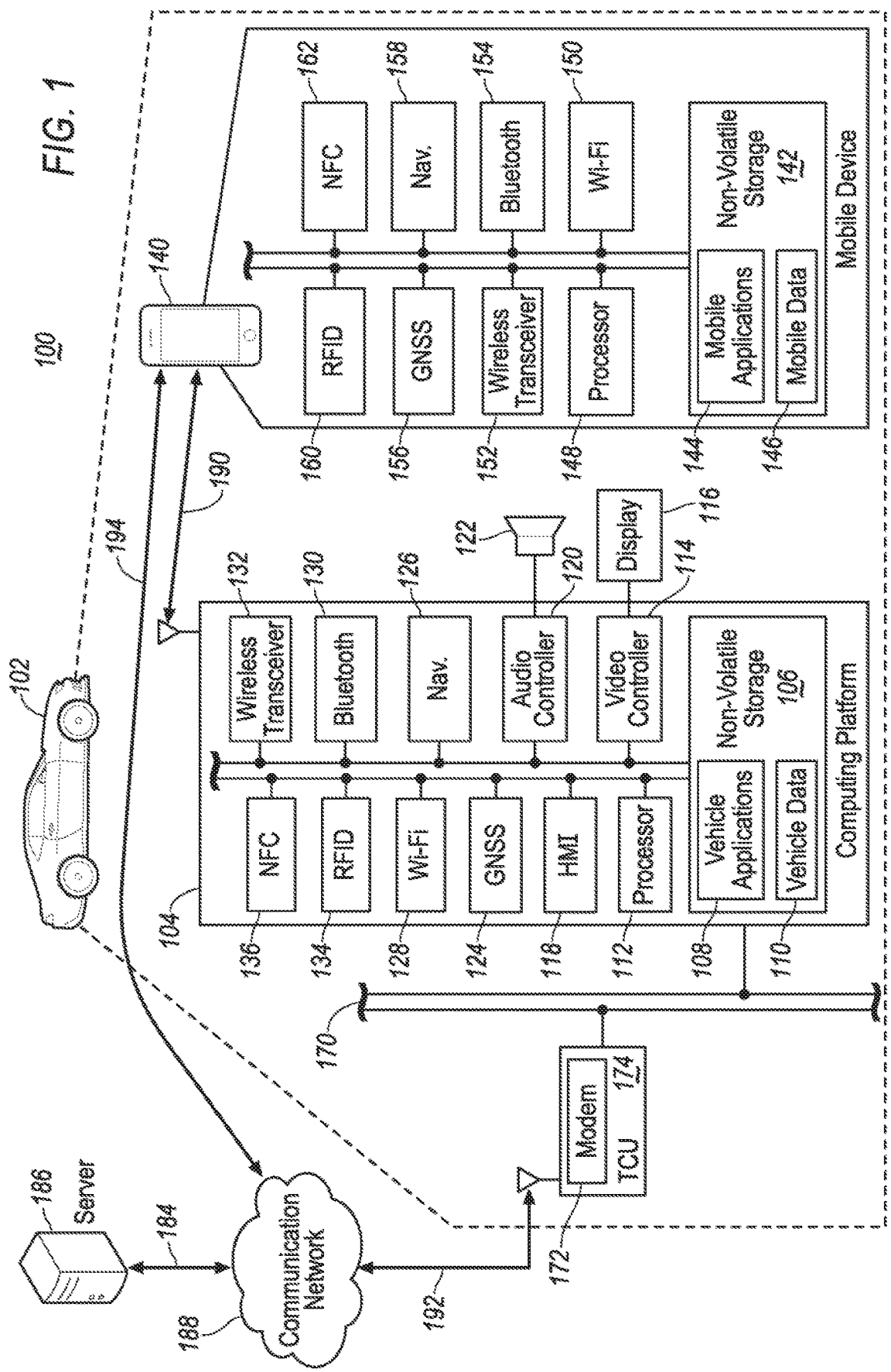
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, online ordering, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 116 as a part of the vehicle applications 108.

The computing platform 104 may be configured to wirelessly communicate with a mobile device 140 of the vehicle users/occupants via a wireless connection 190. The mobile device 140 may be any of various types of portable computing device, such as cellular phones, tablet computers, wearable devices, smart watches, laptop computers, portable music players, or other device capable of communication with the computing platform 104. The wireless transceiver 132 may be in communication with a WiFi controller 128, a Bluetooth controller 130, a radio-frequency identification (RFID) controller 134, a near-field communication (NFC) controller 136, and other controllers such as a Zigbee transceiver, an IrDA transceiver (not shown), and configured to communicate with a compatible wireless transceiver 152 of the mobile device 140.

The mobile device 140 may be provided with a processor 148 configured to perform instructions, commands, and other routines in support of the processes such as navigation, telephone, wireless communication, and multi-media processing. For instance, the mobile device 140 may be provided with location and navigation functions via a navigation controller 158 and a GNSS controller 156. The mobile device 140 may be provided with a wireless transceiver 152 in communication with a WiFi controller 150, a Bluetooth controller 154, a RFID controller 160, a NFC controller 162, and other controllers (not shown), configured to communicate with the wireless transceiver 132 of the computing platform 104.

The computing platform 104 may be further configured to communicate with a telematics control unit (TCU) 174 via one or more in-vehicle network 170. The in-vehicle network 170 may include, but is not limited to, one or more of a controller area network (CAN), an Ethernet network, and a media-oriented system transport (MOST), as some examples. The TCU 174 may be configured to control telecommunication between vehicle 102 and a communication network 188 through a wireless connection 192 using a modem 172. The communication network 188 may be any type of wireless network such as a cellular network enabling the communication between a remote server 186 and the computing platform 104. It is noted that, the remote server 186 is used as a general term throughout the present disclosure and may refer to any cloud-based services involving multiple servers, computers, devices and the like.

Figure 2:
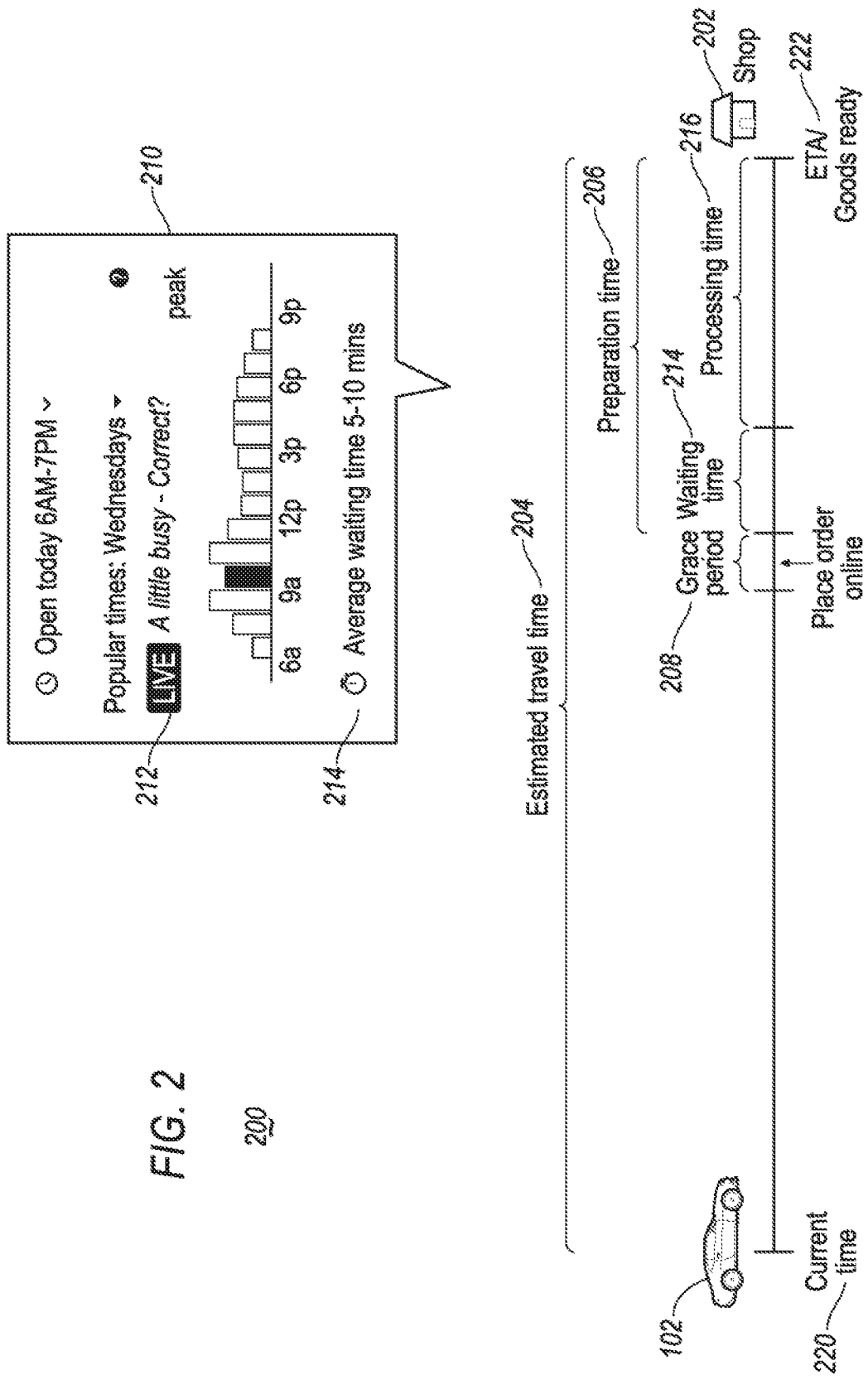
FIG. 2 illustrates an example diagram of one embodiment of the present disclosure.

Referring to FIG. 2, an example diagram of one embodiment of the present disclosure is illustrated. With continuing reference to FIG. 1, the computing platform 104 may be configured to allow a user of vehicle 102 to place an online order for goods via the HMI controls 118 using a software application stored in the storage 106 e.g. as a part of the vehicle applications 108 previously installed. The order may be sent to the server 186 via the TCU 174 through the communication network 188. For instance, the user may place a breakfast order including food and beverages to pick up a shop/business 202 on his/her route from home to work. Due to the perishable nature of the goods/items, one of the purposes of the present embodiment is to send the order to the shop 202 at a calculated time that allows the shop 202 to prepare the goods and have the goods ready at substantially the same time as the vehicle 102 arrives. The computing platform 104 may be configured to allow the user to place a pre-order to the computing platform 104 by selecting the goods via the HMI controller 118 before starting the trip. The pre-order will be put on hold until a calculated time when the computing platform 104 places the order online to the shop 202.

As illustrated in FIG. 2, an estimated travel time (ETT) 204 represents the period of time that it takes the vehicle 102 to travel to the shop 202. For instance, the ETT 204 may be the difference between an estimated time of arrival (ETA) 222 and a current time 220. Initially at the beginning of the trip the ETT 204 may be significantly longer than a goods preparation time 206 that the shop 202 needs to prepare the goods in total. As the vehicle 102 traverses the route and gets closer to the shop 202, the ETT 204 may gradually reduce. The preparation time 206 may further include a current/predicted waiting time period 214 at the shop 202 and an estimated goods processing time 216. The waiting time 214 represents the time period that customers is waiting or predictively will be waiting before being serviced at the shop 202. In general, the more popular the shop 202 is, the longer the waiting time 214 is. For instance, the computing platform 104 may obtain the current/predicted waiting time 214 from publicly available sources 210 such as Google Maps®, website of the shop 202, or the like. As reflected in the source 210, in the present example, the current status 212 for shop 202 between 9 and 10 am is "a little busy" with an average waiting time of 5-10 minutes. In addition, the source 210 may further provide predicted popularities for following hours which may help predict the average waiting time in a time frame when the vehicle 102 is estimated to arrive at the shop 202. The processing time 216 represents the period of time it takes the shop 202 to actually prepare the goods ordered, e.g. usually after the waiting time 214. In general, the more goods that is ordered, the longer the processing time 216 is. The processing time 216 may be calculated by the computing platform 104 using software. Each item that is available for online ordering via the software may be pre-assigned a processing time. For instance, a breakfast sandwich may be assigned a processing time of 2 minutes and an ice tea may be assign a processing time of 1 minute to prepare. Depending on what items the user orders, a total processing time 216 may be calculated. Having obtained the waiting time 214 and the processing time 216 for the goods, the computing platform 104 may calculate the total preparation time 206 by summing the waiting time 214 and the processing time 216.

The ETT 204 may be calculated via the navigation controller 126 using location data from the GNSS controller 124 and the address information of the shop 202. A route from the current location of the vehicle 102 and the shop 202 may be calculated by the navigation controller 126. As the vehicle 102 traverses the route and gets closer to the shop 202, the navigation controller 126 may constantly recalculate/update the ETT 204 as well as the ETA 222 to obtain a more accurate result. For instance, the process may start with the user placing the order via the HMI controls 118. Responsive to receiving the pre-order that the user placed to the vehicle platform 104 indicative of a pick-up location i.e. shop 202, the navigation controller 126 may automatically calculate a route from the current location of the vehicle 102 to the shop 202. The ETT 204 and the ETA 222 may be obtained based on the route and various factors along the route such as traffic conditions. The route calculated via the navigation controller 126 may be based on various factors such as predefined route planning rules (e.g. no unpaved road, avoid highway, or etc.), historic routes and preferences for the same user, traffic conditions or the like. The navigation controller 126 may be further configured to dynamically adjust the route and recalculate the ETT 204 and the ETA 222 responsive to detecting a change of situation such as a user-initiated route change or traffic conditions. The computing platform 104 may be configured to present the route to the vehicle user via the display 116 and/or the speaker 122. Alternatively, depending on the preference of the user, the computing platform 104 may not present the route to the user while actively monitoring the route, the ETT 204 and the ETA 222.

As the vehicle 102 traverses the route and the ETT 204 approaches the preparation time 206, the computing platform 104 may be configured to send the order out to the shop 202 via the TCU 174 within a grace period 208 immediately before the ETT 204 reaches the preparation time 206. As an example, the grace period 208 may be a predefined fixed period of time (e.g. 5 minutes). Before submitting the order online to the shop 202, the computing platform 104 may prompt a message via the HMI controls 118 to ask for a final confirmation from the user to place the order. The user may confirm or cancel the order. Additionally, the user may be further given options to modify or delay the order. Responsive to receiving a confirmation from the user, the computing platform 104 may send the order to the server 186 associated with the shop 202 via the TCU 174. The computing platform 104 may further send the EAT 222 to the server 186 as a reference to the shop 202.

Figure 3:
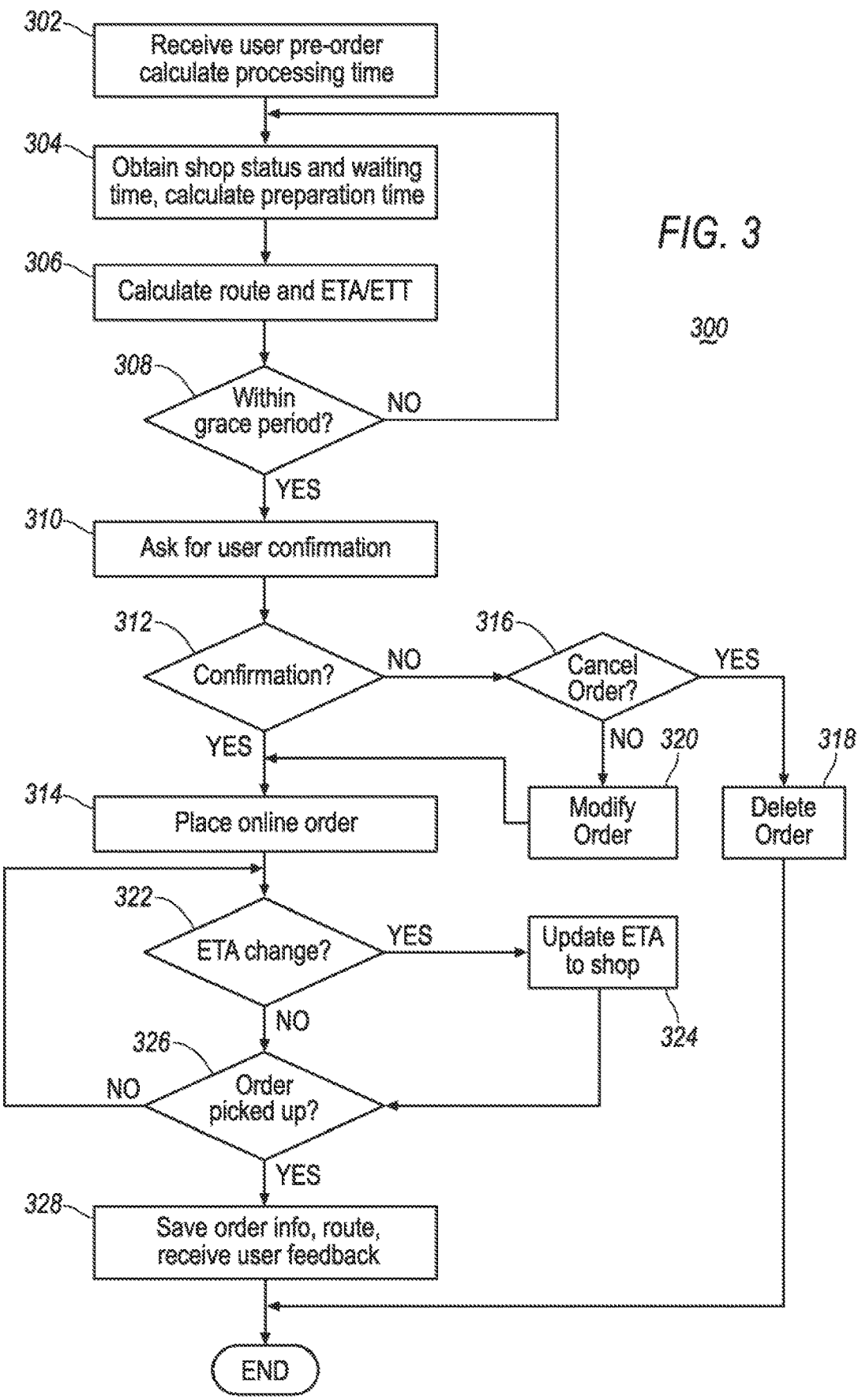
FIG. 3 illustrate an example flow diagram of one embodiment of the present disclosure.

Referring to FIG. 3, an example flow diagram for a process 300 of one embodiment of the present disclosure is illustrated. With continuing reference to FIGS. 1 and 2, at operation 302, the computing platform 104 receives a user input placing a pre-order to pick up at the shop 202. The pre-order may be received via the HMI controls 118 by way of one or more buttons, or the display 116 provided with touch screen features. Responsive to receiving the pre-order, the computing platform 104 calculates the processing time 216 for the items included in the pre-order. As discussed above, a default processing time for each item may be stored in the storage 106 with the software application 108. Additionally or alternatively, the processing time may be variable and downloaded from the server 186 via the TCU 174 in a real-time manner. The computing platform 104 may temporarily store the pre-order in the storage 106 at this stage without actually sending out via the TCU 174.

Responsive to receiving the pre-order, at operation 304, the computing platform 104 obtains the current and/or predicted shop status 210 including the waiting time 214 from the server 186 via the TCU 174. Having obtained the waiting time 214 and the processing time 216, the computing platform 104 may calculate the preparation time 206. For instance, the preparation time 206 may be calculated by summing the waiting time 214 and the processing time 216 together. At operation 306, the computing platform 104 calculates a route from the current location of the vehicle 102 received from the GNSS controller 124 to the shop address, and obtains the ETA 222 as well as the ETT 204 taking into account various available factors such as live traffic received from the server 186.

At operation 308, the computing platform 104 checks whether the ETT 204 has reached the grace period from the preparation time 206 before the ETA 222. The grace period 208 may be a fix period of time such as 5 minutes. Alternatively, the computing platform 104 may use a flexible grace period 208 depending on various factors including the traffic, the popularity of the shop, the perishable nature of the goods ordered or the like as a few non-limiting examples. If the answer for operation 308 is a no, the process repeats operations 304 and 306, and the computing platform 104 continues to monitor the status 210 of the shop 202 and update the ETA 222 and ETT 204. The computing platform 104 may be configured to periodically check the ETT 204 against the preparation time 206 at one or more predefined intervals. The computing platform may check the ETT 204 against the preparation time 206 in a less frequent manner at the beginning, and increase the checking frequency as the gap between the ETT 204 and the preparation time 206 reduces. For instance, at the beginning of the trip, the ETT 204 (e.g. 30 minutes) may be greater than five times the preparation time 206 (e.g. 5 minutes). In this case, the computing platform 104 may be configured to check the ETT 204 against the preparation time 206 every two times the preparation time 206, i.e. every 10 minutes. As the vehicle 102 traverses the route and the ETT 204 reduces to within five times the preparation time 206 but greater than two times the preparation time 206, the computing platform 104 may be configured to increase the checking frequency to one half the preparation time 206, i.e. every 2.5 minutes, until the ETT 204 reaches within the grace period 208 to the preparation time 206. If the computing platform 104 detects the ETT 204 has reached the predefined grace period 208 at operation 308, the process proceeds to operation 310 and the computing platform 104 asks for a confirmation before placing the order for the items online via the TCU 174. A pop-up message may be displayed on the display 116 to ask the user for confirmation.

Responsive to receiving a user input confirming the order, e.g. via the HMI controls 118, the process proceeds to operation 314 and the computing platform 104 loads the pre-order temporarily stored in the storage 106 and sends the pre-order out to the server 186 via the TCU 174 to place the order. Additionally, the computing platform 104 sends the ETA 222 to the server 186 along with the order placed. If the computing platform 104 detects the user fails to confirm and intents to do something else, the process proceeds to operation 316 and the computing platform 104 asks if the user would like to cancel the order. Responsive to a user input confirming to cancel the order, the process proceeds to operation 318 and the computing platform 104 deletes the pre-order from the storage 106. Otherwise, at operation 320, an option may be provided to the user via the HMI controls 118 to allow the user to modify the order based on the pre-order stored in the storage 106 (e.g. change goods, schedule a different pickup time or the like). Responsive to receiving a modified order from the user, the process proceeds from operation 320 to operation 314 to place the modified order online.

After the order has been placed to the server 186, the computing platform 104 continues to monitor the route and ETA 222 via the navigation controller 126. At operation 322, if the computing platform 104 detects a significant deviation on ETA 222, the process proceeds to operation 324 to notify the shop 202 about the updated ETA 222. For instance, a significant deviation on ETA may be defined as a difference between the original ETA 222 when the order was placed and an updated ETA 222 being greater than a predefined threshold (e.g. 3 minutes or so). In reality, the deviation may be caused by various factors including change of traffic conditions (e.g. an accident), change of the route (e.g. the user takes a wrong turn) or the like. The computing platform 104 may be further configured to receive an order status from the server 186 indicative of confirmation of receipt of the order and/or an expected time when the order will be ready for pickup to keep the vehicle user informed. At operation 326, the computing platform 104 detects if the order has been picked up by the user. This operation may be performed automatically by detecting the vehicle 102 has stopped at the shop location for longer than a predefined period of time (e.g. 30 seconds). Additionally or alternatively, the computing platform 104 may be configured to receive a manual input from the user via the HMI controls 118 or a feedback signal from the shop 202 via the server 186 through the TCU 174 indicative of the pickup has been completed. If at operation 326, the computing platform 104 detects the pickup has not been completed yet, the process returns to operation 322 to continue to monitor the ETA 222. Responsive to detecting a successful pickup, at operation 328, the computing platform 104 saves the order information and the route traversed by the vehicle 102 for future reference. The computing platform 104 may be further configured to ask for a user feedback on the likelihood of a next trip being the one associated with the present online order, e.g. by asking the user to rate the present ordering experience from one to five with one being the least likely to repeat the order and five being the most likely to use the service again.

The present disclosure may be further applied to other situations. For instance, the user may use the mobile device 140 to place the online order. While connected to the computing platform 104 via the wireless connection 140, the user may interact with the mobile device 140 via the HMI controls 118 to perform an ordering process substantially the same as the process 300 illustrated with reference to FIG. 3. Alternatively, the present disclosure is not limited to be implemented to a private vehicle 102. The adaptive ordering process may be applied to a user using the mobile device in shared ride and/or public transportation situations under substantially the same principle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a user interface programmed to interact with a user;
a wireless transceiver programmed to communicate with one or more cloud servers via a wireless connection;
a location controller programmed to communicate one or more satellites to obtain a vehicle location; and
a controller, programmed to
responsive to user input to pick up an item at a shop, obtain, from the one or more cloud servers, traffic data indicative of a traffic condition with respect to a route from the vehicle location to the shop,
calculate an estimated time of arrival (ETA) to the shop using the traffic data,
obtain, from the one or more cloud servers, a predicted popularity data at the shop at the ETA,
calculate a predicted waiting time using the predicted popularity data, wherein the predicted waiting time is indicative of a time to wait at the shop at the ETA when the vehicle is schedule to arrive at the shop,
calculate a preparation time for the item by the shop using the predicted waiting time and a pre-assigned processing time,
determine a grace period based on a perishable nature of the item, and
responsive to a current time being within the grace period to the preparation time before the ETA, place an order for the item via the wireless transceiver through the one or more cloud servers.

2. The vehicle of claim 1, wherein the controller is further programmed to send the ETA to the one or more cloud servers.

3. The vehicle of claim 2, wherein the controller is further programmed to, responsive to detecting an ETA deviation greater than a predefined threshold, send an updated ETA to the one or more cloud servers.

4. The vehicle of claim 1, wherein the controller is further programmed to ask for a user confirmation via the user interface before placing the order.

5. The vehicle of claim 4, wherein the controller is further programmed to responsive to the user decline to confirm the order through the user interface, modify the order to add a second item, and place the modified order.

6. The vehicle of claim 1, wherein the controller is further programmed to receive user feedback on a likelihood of a next order via the user interface.

7. A method for a vehicle, comprising:
communicating, via a location controller, with one or more satellites to obtain a vehicle location;
responsive to receiving, via a user interface, a user input to pick up an item at a shop, obtaining, from one or more cloud servers via a wireless transceiver, a traffic data on a route from the vehicle location to the shop, a predicted waiting time at the shop, and a pre-assigned processing time for the item;
calculating, via a controller, an estimated time of arrival (ETA) to the shop using the traffic data and a predicted preparation time for the item by the shop including the predicted waiting time and the processing time for the item, wherein the predicted waiting time is indicative of a time to wait at the shop at the ETA when the vehicle is schedule to arrive at the shop; and
responsive to a current time being within a predefined grace period to the preparation time before the ETA, ordering, via the wireless transceiver, the item online, wherein the grace period is based on a perishable nature of the item.

8. The method of claim 7, further comprising:
sending the ETA to a server associated with the shop.

9. The method of claim 8, further comprising:
responsive to detecting an ETA deviation greater than a predefined threshold, sending an updated ETA to the server.

10. A non-transitory computer-readable medium comprising instructions that, when executed by a processor of a vehicle, cause the vehicle to:
communicate, via a location device, with one or more satellites to obtain a vehicle location,
responsive to user input to pick up an item at a shop, obtain, from one or more cloud servers via a wireless transceiver, a traffic data on a route from the vehicle location to the shop and a predicted popularity data at the shop;
calculate, via a controller, an estimated time of arrival (ETA) to the shop using the traffic data, a predicted waiting time using the predicted popularity data, and a preparation time for the item by the shop including the waiting time and a pre-assigned processing time for the item, wherein the predicted waiting time is indicative of a time to waft at the shop at the ETA when the vehicle is schedule to arrive at the shop;
determine a grace period based on a perishable nature of the item; and
responsive to a current time being within the grace period to the preparation time before the ETA, place an order for the item online.

11. The non-transitory computer-readable medium of claim 10, further comprising instructions that, when executed by a processor of a vehicle, cause the vehicle to:
send the ETA to the one or more cloud servers associated with the shop; and
responsive to detecting an ETA deviation greater than a predefined threshold, send an updated ETA to the one or more cloud servers.

12. The non-transitory computer-readable medium of claim 10, further comprising instructions that, when executed by a processor of a vehicle, cause the vehicle to:
output a message, via a user interface, to ask for a user confirmation before placing the order; and
responsive to the user failing to confirm via the user interface, modify the order to add a second item, and place the modified order.

* * * * *